US012316161B2

(12) United States Patent
Sowder et al.

(10) Patent No.: US 12,316,161 B2
(45) Date of Patent: May 27, 2025

(54) SOFT MAGNETIC COMPOSITE FIXATION WITHIN METAL POWDER COPPER ROTOR

(71) Applicant: Metal Powder Products, LLC, Noblesville, IN (US)

(72) Inventors: Terry Lee Sowder, Salem, IN (US); Ronald Dean Payne, Mitchell, IN (US); Anne N. Good, Bell Buckle, TN (US); Nicola M. Gismondi, Noblesville, IN (US)

(73) Assignee: Metal Powder Products, LLC, Noblesville, IN (US)

( * ) Notice: Subject to any disclaimer, the term of this patent is extended or adjusted under 35 U.S.C. 154(b) by 337 days.

(21) Appl. No.: 17/811,925

(22) Filed: Jul. 12, 2022

(65) Prior Publication Data

US 2024/0022121 A1 Jan. 18, 2024

(51) Int. Cl.
| | |
|---|---|
| *H02K 1/02* | (2006.01) |
| *H02K 1/22* | (2006.01) |
| *H02K 1/28* | (2006.01) |
| *H02K 15/03* | (2025.01) |

(52) U.S. Cl.
CPC ............... *H02K 1/02* (2013.01); *H02K 1/223* (2013.01); *H02K 1/28* (2013.01); *H02K 15/03* (2013.01)

(58) Field of Classification Search
CPC ........... H02K 1/02; H02K 1/223; H02K 1/28; H02K 15/03; H02K 15/022; H02K 1/24
See application file for complete search history.

(56) References Cited

U.S. PATENT DOCUMENTS

| | | | |
|---|---|---|---|
| 10,903,729 B1 * | 1/2021 | Cunnyngham | ....... H01F 41/068 |
| 10,938,258 B1 | 3/2021 | Cunnyngham et al. | |
| 10,951,103 B1 | 3/2021 | Cunnyngham et al. | |
| 11,025,107 B2 | 6/2021 | Paritee et al. | |
| 11,081,934 B2 | 8/2021 | Paritee et al. | |
| 11,088,578 B2 | 8/2021 | Cunnyngham et al. | |
| 2019/0214883 A1 * | 7/2019 | Klassen | ................. H02K 7/088 |
| 2021/0218321 A1 | 7/2021 | Cunnyngham et al. | |

* cited by examiner

*Primary Examiner* — Thomas Truong
(74) *Attorney, Agent, or Firm* — Howard & Howard Attorneys PLLC (57) ABSTRACT

A rotor includes a rotor winding that includes core recesses that are defined through the rotor winding. Raised protrusions are located on a top surface of the rotor winding and positioned adjacent to the core recesses. A core is fit at least partially into each of the core recesses, and a force is applied on the top surface of the rotor winding and the top surface of the cores to fit the cores within the core recesses. As the force is applied to the top surface of the rotor winding, the raised protrusions adjacent to the core recesses are deformed so that the material from the raised protrusion flows into the adjacent core recess. This extra material helps to secure the core within the core recess.

20 Claims, 14 Drawing Sheets

SOFT MAGNETIC COMPOSITE FIXATION WITHIN METAL POWDER COPPER ROTOR

BACKGROUND OF THE INVENTION

Electric motors are capable of converting electric energy into mechanical energy, typically through the interaction of a magnetic field and an electric current. These electric motors often use magnets fixed within a rotor to create the magnetic fields that are necessary to operate the motor. These magnets need to be properly secured within the electric motor to allow operation of the motor at a desired power level and efficiency.

Thus, there is a need for improvement in this field.

SUMMARY OF THE INVENTION

In certain embodiments, a rotor includes a rotor winding including a top surface and at least one core recess defined through a thickness of the rotor winding. In some embodiments, the rotor winding may be formed using a powder metallurgy process and made from copper. At least one raised protrusion extends from the top surface of said rotor winding, adjacent to one of the core recesses. When there are multiple core recesses, the rotor winding includes multiple raised protrusions, and at least one raised protrusion is positioned adjacent to each of the core recesses.

The one or more core recesses each include an inner recess surface that is positioned radially inward of an outer recess surface and opposing side recess surfaces that extend between said inner recess surface and said outer recess surface. In some examples, a length of said inner recess surface is less than a length of said outer recess surface. An inner raised protrusion may protrude from said top surface of said rotor winding adjacent to said inner recess surface of said core recess. An outer raised protrusion may protrude from said top surface of said rotor winding adjacent to said outer recess surface. In some examples, the core recesses are arranged in a circular pattern on the rotor winding and positioned radially outward of a central recess of the rotor winding.

The rotor also includes one or more cores that are shaped to fit within a respective core recess defined through the rotor winding. The cores may be formed from any desired form of magnet or magnet alternative. In some instances, the cores may be made from a soft magnetic composite material. The soft magnetic composite material may be coated with an electrically insulated layer. In some embodiments, the soft magnetic composite material is formed from pure iron powder particles.

Upon application of force to the top surface of the rotor winding and to the one or more cores, the one or more raised protrusions are deformed so that material from each of the raised protrusions flows into the corresponding, adjacent core recess to secure the core within the core recess.

Some embodiments may include a method of forming a rotor. In some embodiments, the method may include pressing metal slugs to for a rotor winding blank through a powder metallurgy process. In some instances, copper slugs may be used so that the rotor winding blank is made from copper. In alternative embodiments, the rotor winding may be formed from a wrought material such as copper or aluminum rather than through powder metallurgy. Next, the rotor winding blank may be machined to form one or more core recesses defined through the rotor winding.

The machining process may also form one or more raised protrusions adjacent to each of the core recesses. The one or more raised protrusions may extend from a top surface of the rotor winding. In some embodiments, each core recess may have two adjacent raised protrusions. One of said raised protrusions may be positioned adjacent to an inner surface of said core recess and the other of said raised protrusions may be positioned adjacent to an outer surface of said core recess.

A core is inserted into each of the one or more core recesses defined through a rotor winding. A force may be applied to the top surface of the rotor winding and on the top surfaces of each of the cores to push the cores into the respective core recesses. The force deforms said raised protrusions so that material from said raised protrusions flows into the adjacent core recess. Material from the raised protrusions that flows into said adjacent core recesses assists to secure said core within said core recess.

In some embodiments, the method may also include grinding said top surface of said rotor winding and said top surface of the cores after the cores have been inserted into the core recesses and force has been applied to the top surface of the cores and the rotor winding. This grinding may be used to smooth and flatten said top surface of said rotor winding and of said cores.

Further forms, objects, features, aspects, benefits, advantages, and embodiments of the present invention will become apparent from a detailed description and drawings provided herewith.

SPECIFICATION

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 1:
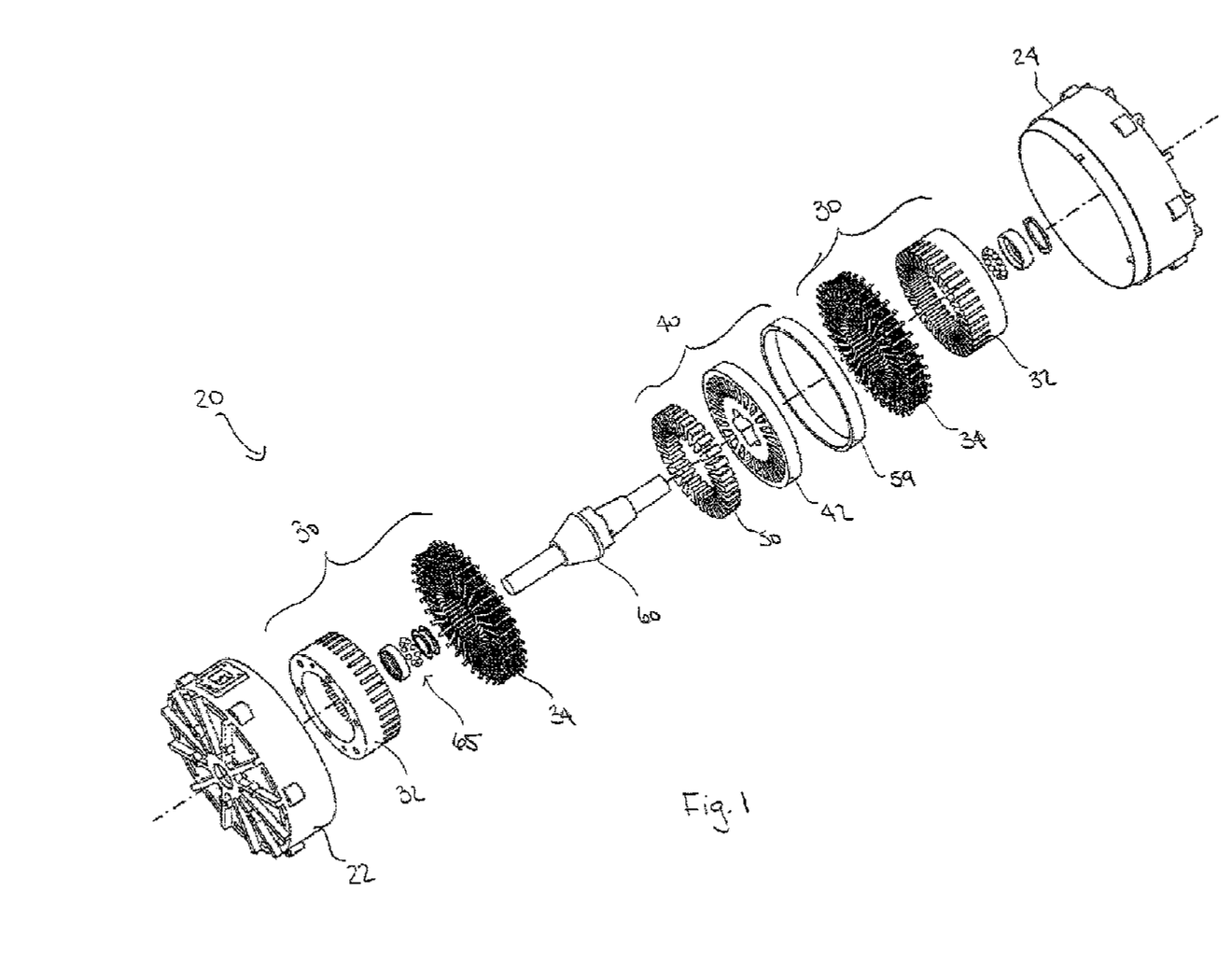
FIG. 1 is an exploded view of an axial flux motor.

An exploded view of an axial flux motor 20 is shown in FIG. 1. The axial flux motor 20 includes two end housings 22, 24 that may connect together to enclose the other components of the axial flux motor 20. The axial flux motor 20 also includes two stators 30. Each stator 30 includes a stator core 32 and a stator winding 34 that is wound around the stator core 32. The stator cores 32 are typically made from a magnetically permeable, resistive material while the stator windings 34 are typically made from an electrically conductive material such as copper, aluminum, or gold. Each of the stator cores 32 may be attached to a respective end housing 22, 24 so that the stator cores 32 remain stationary during operation of the axial flux motor 20.

The axial flux motor 20 also includes a rotor 40. The rotor 40 includes a plurality of cores 50 that fit within core recesses 44 defined through a rotor winding 42. A band 59 may surround the rotor winding 42. The rotor 40 is attached to a shaft 60 which extends axially from each side of the rotor 40. One or more bearing assemblies 65 may surround the shaft 60, providing the shaft 60 with rigid support, but also allowing the shaft 60 to rotate with minimal friction.

Figure 2:
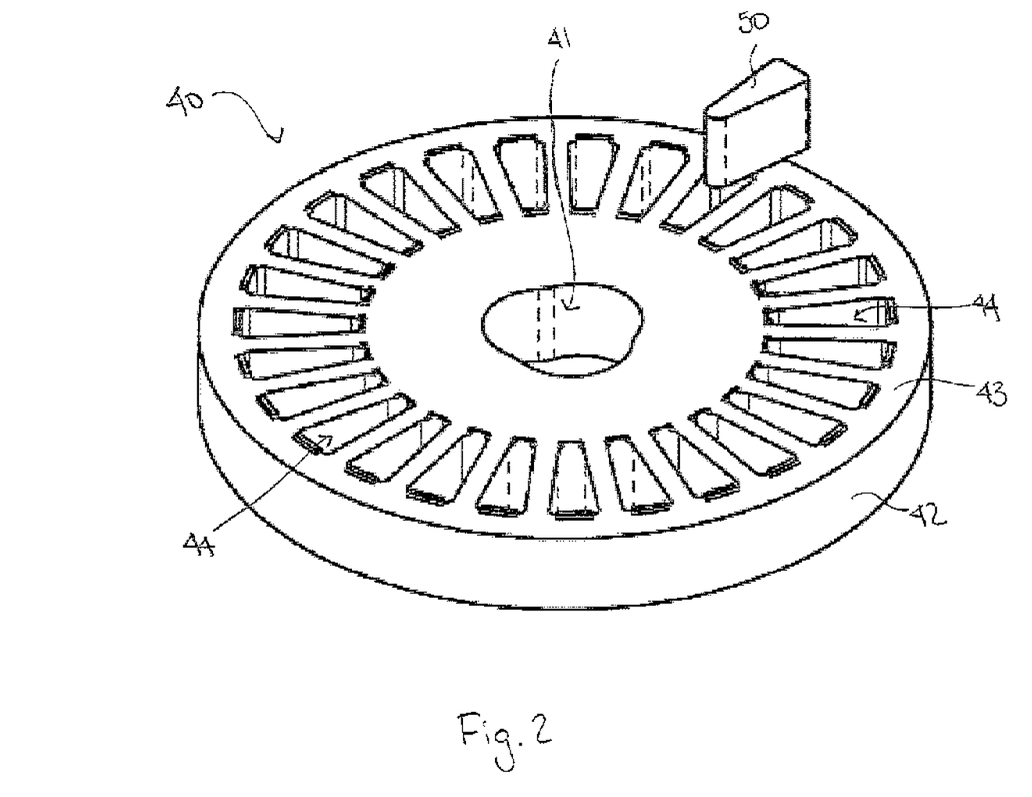
FIG. 2 is a perspective view of a rotor of the axial flux motor of FIG. 1

The rotor 40 is illustrated in FIG. 2. In some embodiments, the rotor 40 may be formed from a powder metallurgy process. As an example, the rotor winding 42 may be formed from a pressed powder metal copper material in which the powder metal copper material has an original density and is pressed to a greater density. In one exemplary powder metallurgy process, 6-inch diameter copper slugs may be pressed to a density of 7.5 g/cc. The copper may then be repressed to a density of 8.46 g/cc. In other embodiments, the slugs used in the powder metallurgy process may be formed from a different suitable material other than copper, may be larger or smaller than 6-inch in diameter, and/or may be pressed to a density of greater than or less than 7.5 g/cc as desired. After being pressed, the copper blanks may then be machined into the desired geometry from the rotor winding 42. In other embodiments, the rotor 40 may be formed by other suitable processes. For example, the rotor winding 42 may be formed from wrought copper or other suitable cast materials.

As shown, the rotor 40 includes the rotor winding 42, which includes a rotor winding top surface 43. A central recess 41 may be defined through the center portion of rotor winding 42 to receive shaft 60. The core recesses 44 are defined through the rotor winding 42, radially outward of the central recess 41. In the embodiment shown, the core recesses 44 are arranged in a circular shape on the rotor winding 42 surrounding the central recess 41.

Figure 3:
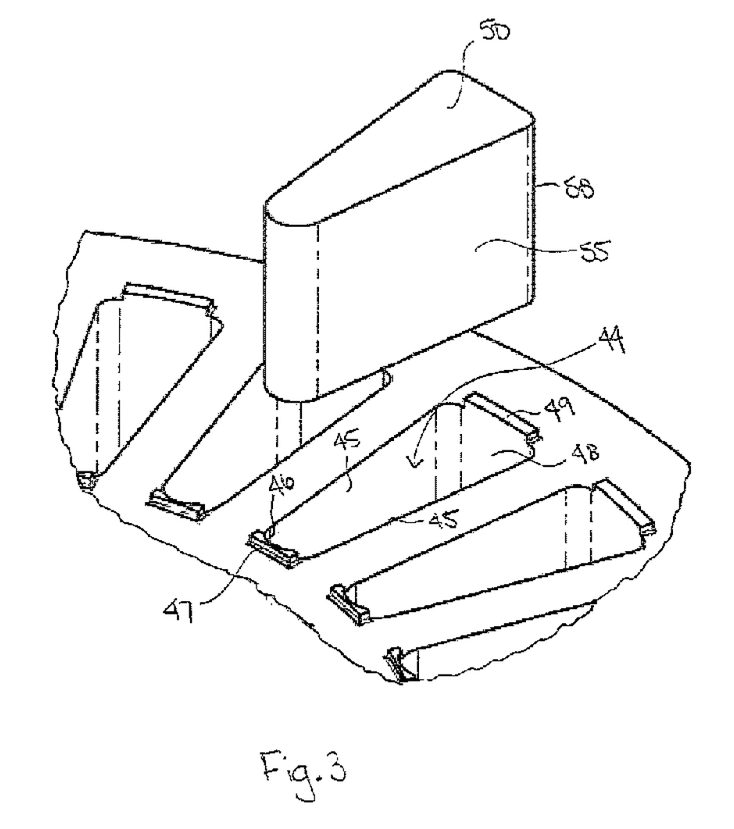
FIG. 3 is a zoomed view of the core and core recess of the rotor of FIG. 2.

As shown in FIG. 3, each of the core recesses 44 includes a pair of tapered side surfaces arranged so that a width of the core recess 44 increases moving radially outward from the center from the rotor winding 42. Each core recess 44 also includes an inner recess surface 46 and an outer recess surface 48 which is arranged radially outward of the inner recess surface 46. Each of the side surfaces 45, the inner recess surface 46, and the outer recess surface 48 extend along the entire thickness of the rotor winding 42 so that the core recess 44 extends through the entire thickness of the rotor winding 42. Although the core recesses 44 are shown as triangular in shape, in other embodiments, the core recesses 44 may be any desired suitable shape. As an example, the core recesses 44 may be rectangular or circular, or the different core recesses 44 defined through a single rotor 40 may have varying shapes.

A plurality of inner raised protrusions 47 extend from the top surface 43 of the rotor winding 42. Each of the inner raised protrusions 47 is positioned adjacent to the inner recess surface 46 of a corresponding core recess 44, along a top edge of the inner recess surface 46. Likewise, a plurality of outer raised protrusions 49 extend from the top surface 43 of the rotor winding 42. Each of the outer raised protrusions 49 is positioned adjacent to the outer recess surface 48 of a corresponding core recess 44, along a top edge of the outer recess surface 48. In the embodiment shown, because of the shape of the core recesses 44 where the inner recess surface 46 of the core recess 44 has a length that is less than the length of the outer recess surface 48, the length of the inner raised protrusions 47 is less than the length of the outer raised protrusions 49. However, in other embodiments, where the core recesses 44 may have different shapes, the length of the inner raised protrusions 47 may be equal to the length of the outer raised protrusions 49, or the length of the inner raised protrusions 47 may be greater than the length of the outer raised protrusions 49.

Each of the cores 50 have a shape that is designed to fit within a respective core recess 44. Core 50 includes tapered side surfaces 55, an inner surface 56, and an outer surface 58. The side surfaces 55 are tapered so that the width of the core 50 at the inner surface 56 is less than the width of the core 50 at the outer surface 58. This gives the core a triangular shape that matches the triangular shape of the core recess 44. In other embodiments, where the core recess 44 may have a different shape than the triangular shape shown in FIG. 3, each of the cores 50 may be shaped to correspond with the alternative shape of the core recess 44.

Each core 50 may be inserted at least partially into a respective core recess 44. Upon the application of force, the inner raised protrusion 47 and the outer raised protrusion 49 are deformable so that the material that forms the raised protrusion 47, 49 is pushed into the core recess 44. This extra material from the raised protrusions 47, 49 that enters the core recess 44 may be used to reduce the clearance between the surfaces 55, 56, 58 of the core 50 and the surfaces of the 45, 46, 48 of the core recess 44 to retain the core 50 within the core recess 44.

The cores 50 may be formed from a soft magnetic composite material. In some examples, the soft magnetic composite may be formed by an insulated material, such as pure iron powder particles that are coated with a very thin, electrically insulated layer. Soft magnetic composites may provide some advantages over cores that are made with a traditional lamination stack technique. Soft magnetic composites may be formed into shapes that are not possible with laminations and may be created to produce isotropic 3-D electro-magnetic flux patterns. The isotropic properties of the soft magnetic composite allow the material to carry magnetic flux in all directions as opposed to a laminated stack. The high resistivity of the soft magnetic composite allows easier design to precisely direct the flow of current within the system. Additionally, near net shape processing may be used to form the soft magnetic composites, eliminating waste and saves cost. Additional advantages of using soft magnetic composite materials to form the cores 50 include the minimization of hysteresis and eddy current losses over a wide range of frequencies and lower labor cost and higher quality due to powder metallurgy processing.

Figure 4:
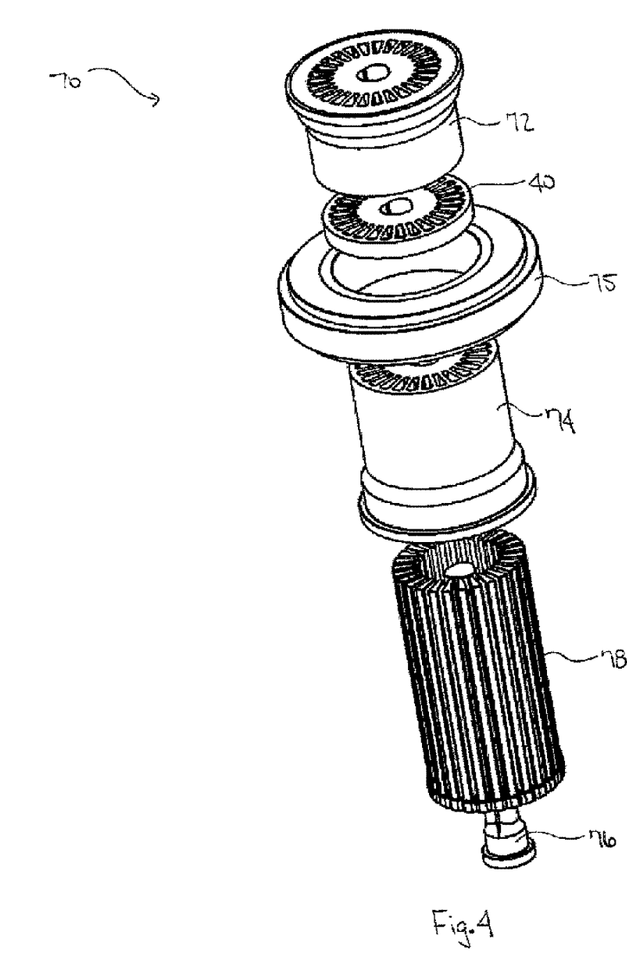
FIG. 4 is an exploded view of a rotor compacting tool assembly for forming the rotor of FIG. 2.
Figure 5:
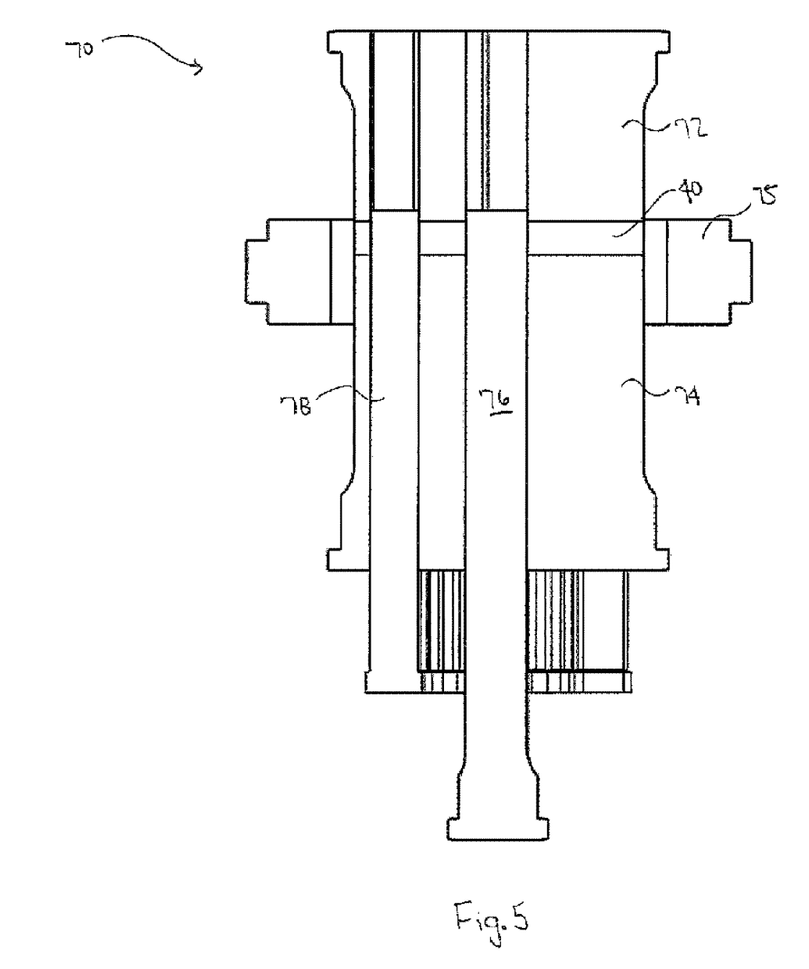
FIG. 5 is a cross-sectional view of the rotor compacting tool assembly of FIG. 4.

FIGS. 4 and 5 illustrate a rotor compacting tool assembly 70 for producing the rotor 40. The rotor compacting tool assembly 70 includes an upper rotor compaction punch 72 and a lower rotor compaction punch 74. The upper rotor compaction punch 72 and the lower rotor compaction punch 74 each include a central opening for receiving a rotor compaction center core 76 that creates the central recess 41 in the rotor. Additionally, the upper rotor compaction punch 72 and the lower rotor compaction punch 74 each include core openings for receiving rotor compaction side cores 78 that are positioned to create the core recesses 44 in the rotor 40. The rotor compacting tool assembly 70 also includes a rotor compaction die 75 that is positioned between the upper rotor compaction punch 72 and the lower rotor compaction punch 74. The rotor compaction die 75 includes a central opening that is sized to define the diameter of the rotor 40.

As shown in the cross-sectional view in FIG. 5, the rotor is fit within the rotor compaction die 75 between the upper rotor compaction punch 72 and the lower rotor compaction punch 74. The upper rotor compaction punch 72 and the lower rotor compaction punch 74 provide compression force on the rotor 40. The rotor compaction center core 76 and the rotor compaction side cores 78 extend through the lower rotor compaction punch 74, through the rotor 40, and into the upper rotor compaction punch 72 to create the central recess 41 and the core recesses 44 in the rotor 40.

Figure 6:
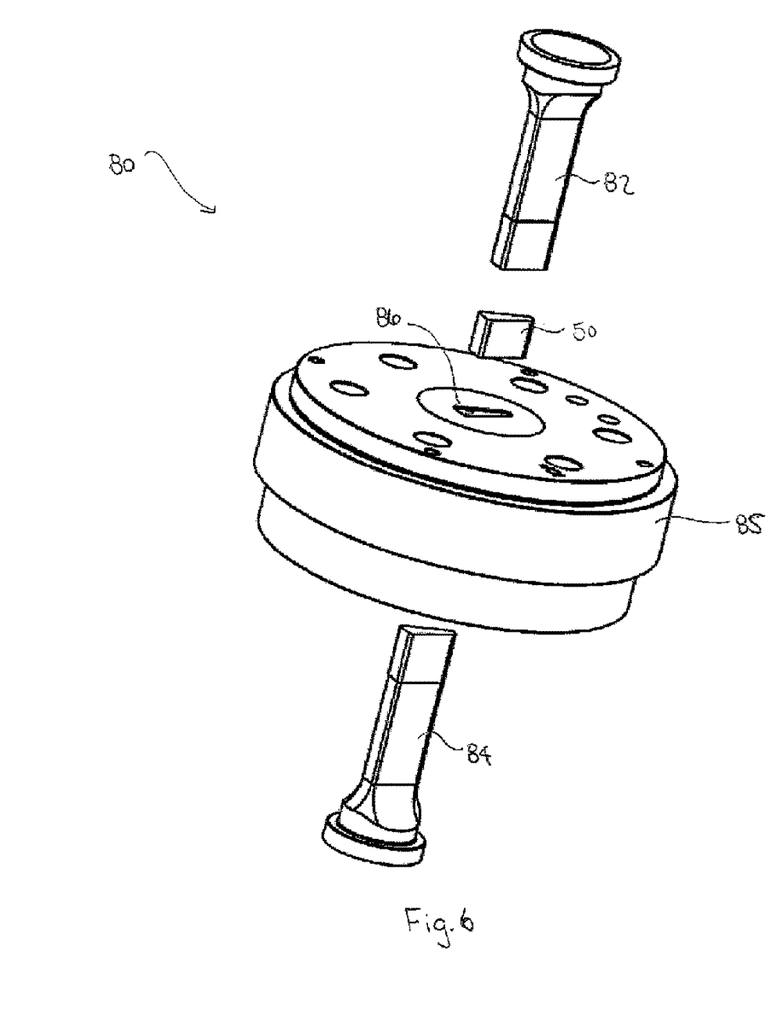
FIG. 6 is an exploded view of a core compaction assembly for forming a core to be inserted into the rotor of FIG. 2.

An exploded view of a core compaction assembly 80 is illustrated in FIG. 6. The core compaction assembly 80 includes an upper core compaction punch 82 and a lower core compaction punch 84. A core compaction die 85 defines a core compaction recess 86 that has the triangular shape of the cores 50 that fit within the core recesses 44 of the rotor 40. An end of the upper core compaction punch 82 and an end of the lower core compaction punch 84 are each shaped to fit within the core compaction recess 86.

Figure 7:
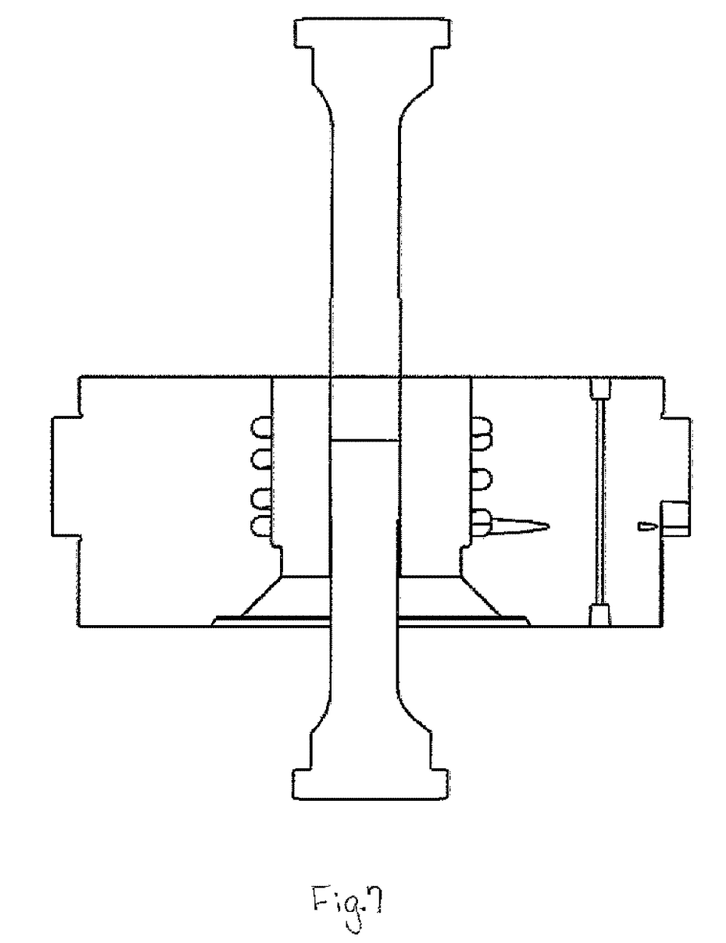
FIG. 7 is a cross-sectional view of the core compaction assembly of FIG. 6.

A cross-sectional view of the core compaction assembly 80 in operation is shown in FIG. 7. The soft magnetic composite material for the core is positioned within the core compaction recess 86 of the core compaction die 85. The lower core compaction punch 84 and/or the upper core compaction punch 82 are inserted within the core compaction recess 86 to compress the material used to form the core 50 to a desired height and density. The core compaction die 85 may be heated and cooled during this process as desired to give the soft magnetic composite material of the core the desired material properties.

Figure 8:
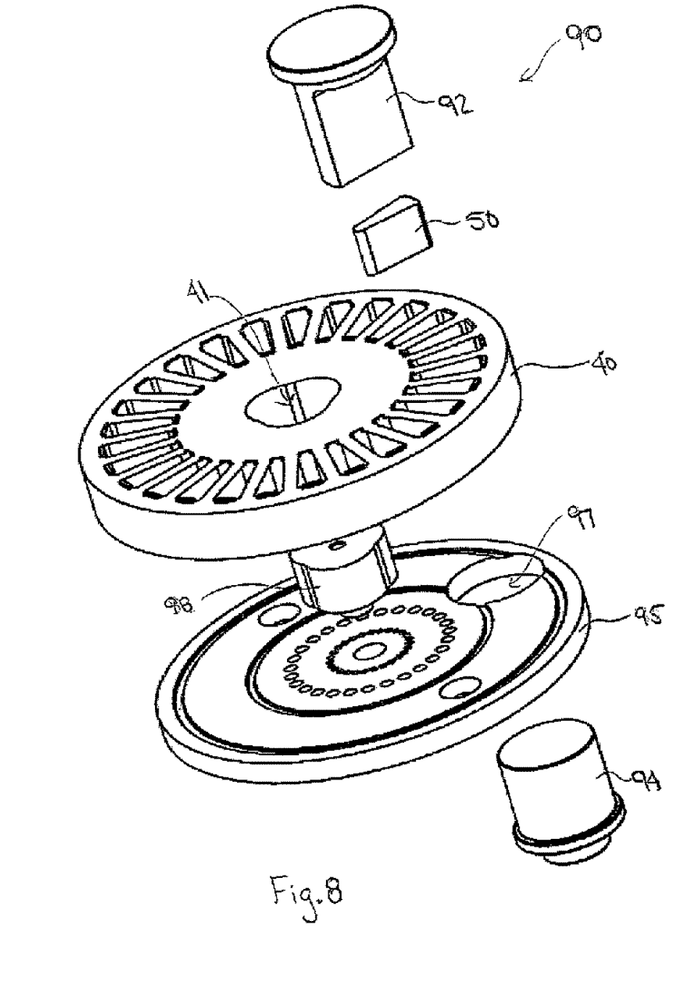
FIG. 8 is an exploded view of a swaging tool assembly for inserting a core into the rotor of FIG. 2.

An exploded view of a swaging tool assembly 90 used to position the core 50 within the core recess 44 is shown in FIG. 8. The swaging tool assembly 90 includes an upper swage tool 92 and a lower swage tool 94, as well as a base plate 95 and a locator 98. The base plate 95 includes a base plate recess 97 for receiving the lower swage tool 94. The rotor 40 is able to rest on base plate 95 while the locator 98 fits within the central recess 41 of the rotor 40 to position and align the rotor 40 on the base plate 95.

Figure 9:
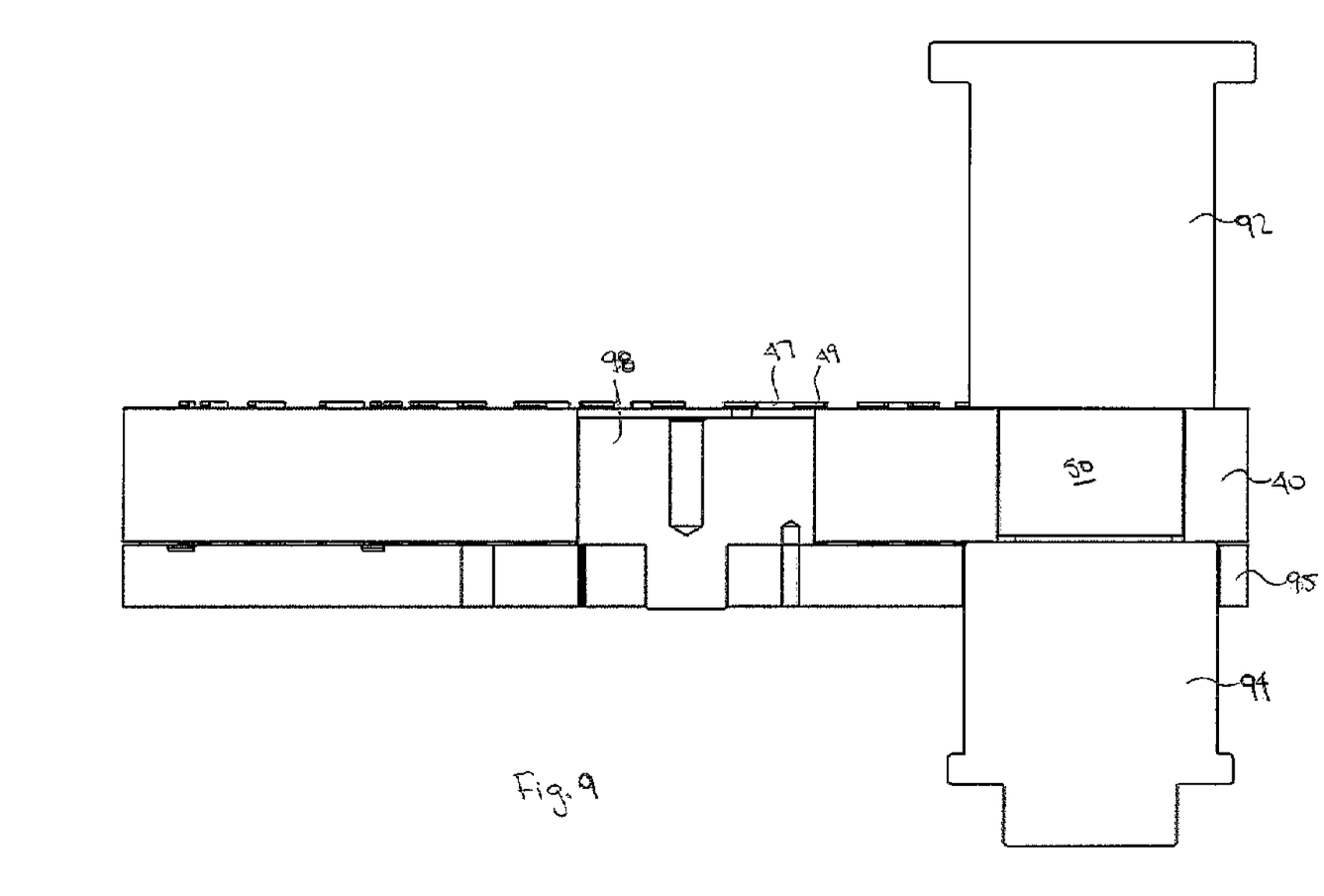
FIG. 9 is a cross-sectional view of the swaging tool assembly of FIG. 8.
Figure 10:
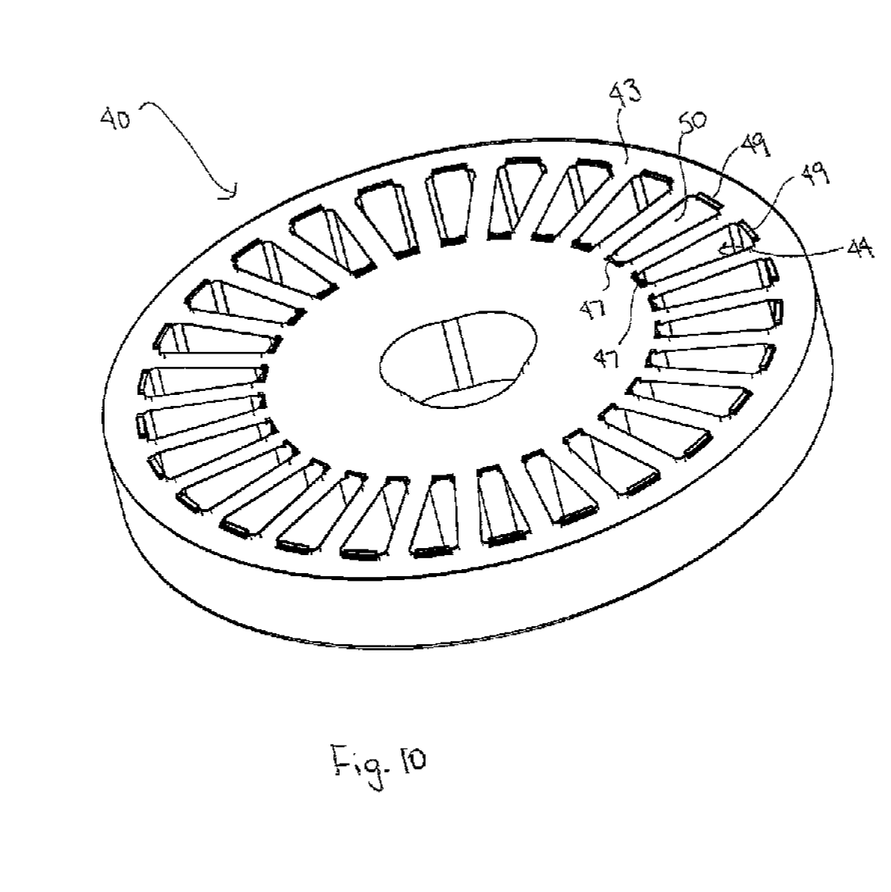
FIG. 10 is a perspective view of the rotor of FIG. 2 with a core inserted into one of the core assemblies.

As shown in the cross-sectional view illustrated in FIG. 9. The core 50 is pushed into the core recess 44 by the upper swage tool 92. As the upper swage tool 92 pushes the core 50 within the core recess 44, the lower swage tool 94 extends through the base plate recess 97 to further compress the rotor 40 and prevent the core 50 from being pushed through the core recess 44. When the upper swage tool 92 pushes the core 50 within the core recess, the upper swage tool 92 contacts the top surface 43 of the rotor 40 and deforms the raised protrusions 47, 49 that are adjacent to the core recess 44, allowing the material from the raised protrusions 47, 49 to fill into the core recess 44 and further secure the core 50 within the core recess 44. The end result of this swaging process is shown in FIG. 10. The core 50 is retained in the respective core recess 44, and the raised protrusions 47, 49 no longer protrude from the top surface 43 of the rotor 40. The rotor 40 may then spun on base plate 95 so that each core recess 44 may be filled with a core 50.

Figure 11:
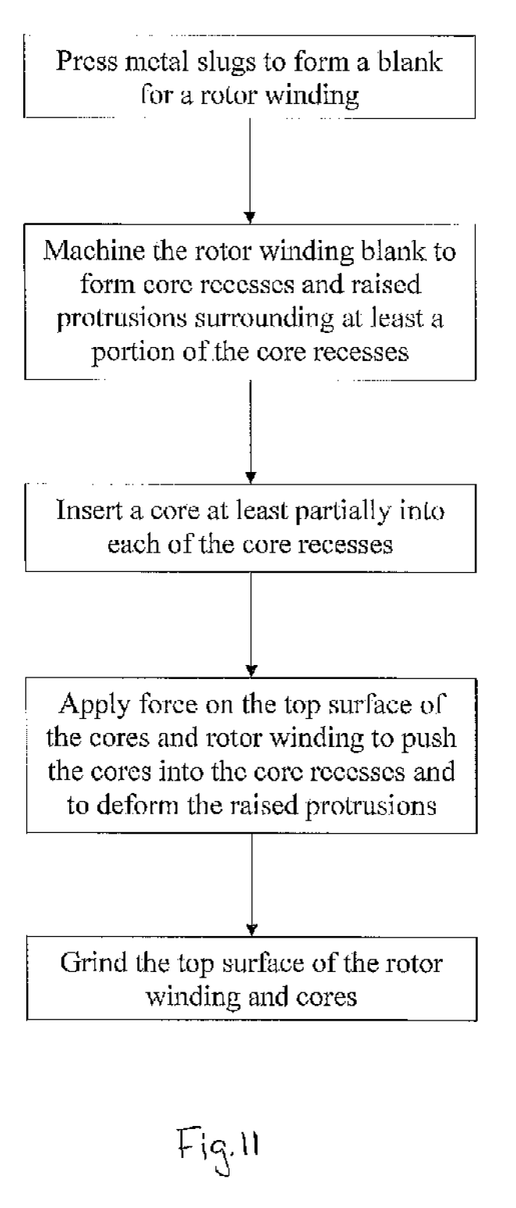
FIG. 11 is a flowchart illustrating a method of assembling a rotor.

A method of assembling a rotor is illustrated in the flowchart 100 shown in FIG. 11. In a first stage 105, metal slugs are pressed to form a blank for a rotor winding. In some embodiments, the metal slugs are made from copper, and the rotor winding blank is made from a powder metallurgy process. In other embodiments, a different process may be used to form the rotor winding blank. For example, the rotor winding blank may be made from wrought copper. The rotor winding blank may be cylindrical with a circular cross-section.

In a second stage 110, the rotor winding blank is machined to form core recesses that are defined through the entire thickness of the rotor winding. The core recesses are arranged in a circular pattern around the rotor winding. The number and the size of the core recesses may vary as desired to fit the particular rotor winding. The rotor winding blank is also machined so that raised protrusions extend from the top surface of the rotor winding. These raised protrusions are positioned adjacent to the core recesses so that each of the core recesses is adjacent to one or more raised protrusions. As an example, there may be a raised protrusion positioned near the radially inner surface of each core recess and another raised protrusion positioned near the radially outer surface of each core recess.

In a third stage 115, a core is inserted at least partially into each of the core recesses defined through the rotor winding. In some embodiments, the core may be able to be manually inserted into a respective core recess so that the entirety of the core is fit into the core recess. In other embodiments, the core may be inserted only partially into the core recess so that part of the core sticks out above the top surface of the rotor winding.

In a fourth stage 120, a force is applied to the top surface of the cores and to the top surface of the rotor winding to push the cores into the respective core recesses, so that the cores are fully inserted into the core recesses. In some embodiments, the force may be applied using a punch or another suitable object. As the force is applied to the top surface of the rotor winding, the raised protrusions that surround portions of the core recesses are deformed so that the material that forms the raised protrusions is pushed into the core recesses. The extra material that flows into the core recesses is used to further secure the core within the respective core recess.

In a fifth stage 125, a surface grinder is used to grind the top surface of the rotor winding and the top surfaces of the cores to smooth what is left of the raised protrusions and to ensure that the top surface of the rotor winding assembly is flat.

This method allows the rotor to be assembled without the use of rare earth magnets and without the need to solder any of the components. Forming the rotor winding from a powdered metallurgy process saves on cost and maintains the strength necessary to operate the rotor.

Figure 12:
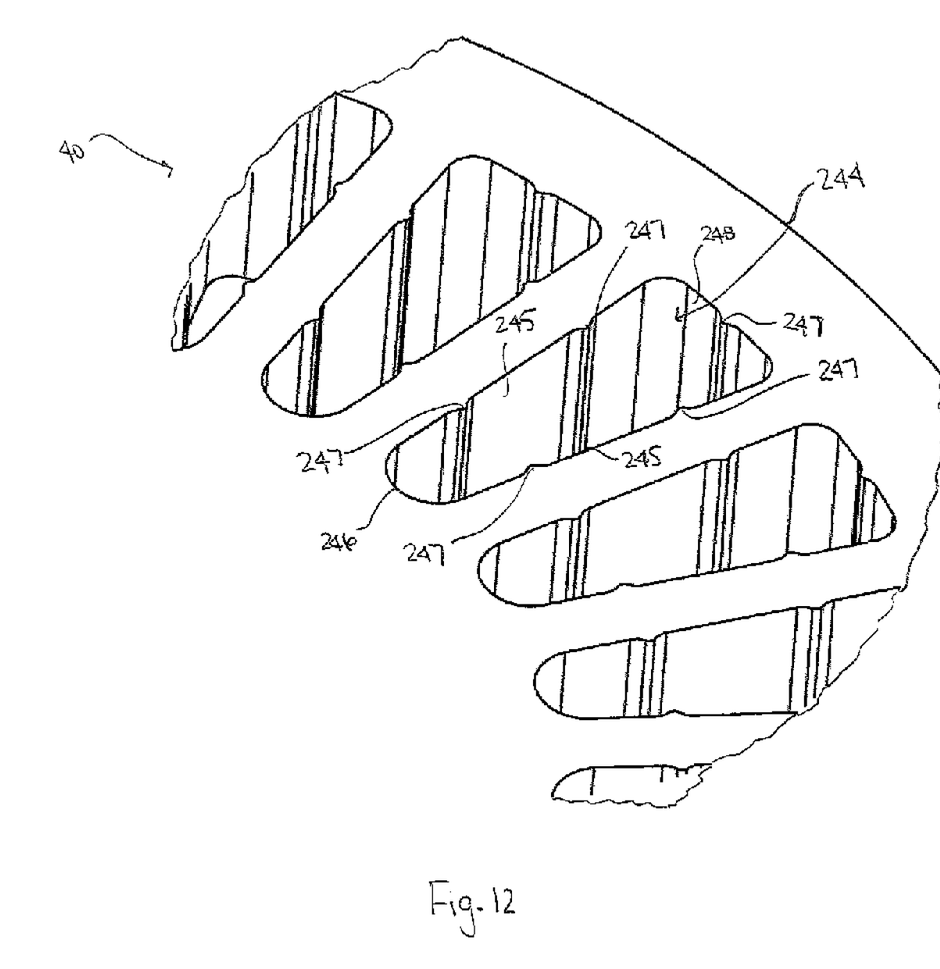
FIG. 12 is a perspective view of an alternative embodiment of a core recess defined through a rotor.

An alternative embodiment of a core recess 244 for rotor 40 is illustrated in FIG. 12. In this alternative embodiment, instead of having raised projections 47, 49 for securing the core 50 within the core recess 244, one or more ribs 247 extend into the core recess 244. As illustrated, the ribs 247 extend within the core recess 244 for the entire thickness of the rotor 40. In the embodiment shown in FIG. 12, there are a total of five ribs 247 that extend into core recess 244. A pair of ribs 247 extends from each side surface 245 that forms the core recess 244, and another rib 247 extends into the core recess 244 from an outer recess surface 248. In this embodiment, no ribs 247 extend from an inner recess surface 246; however, in other embodiments, a rib may be positioned on the inner recess surface 246. In still other embodiments, the number of ribs 247 and the positioning of the ribs 247 within the core recess 244 may be modified as desired so that there are either more or fewer ribs. When a core 50 is inserted into the core recess 244 using force, the ribs 247 provide interference that help to retain the core within the core recess 244.

Figure 13:
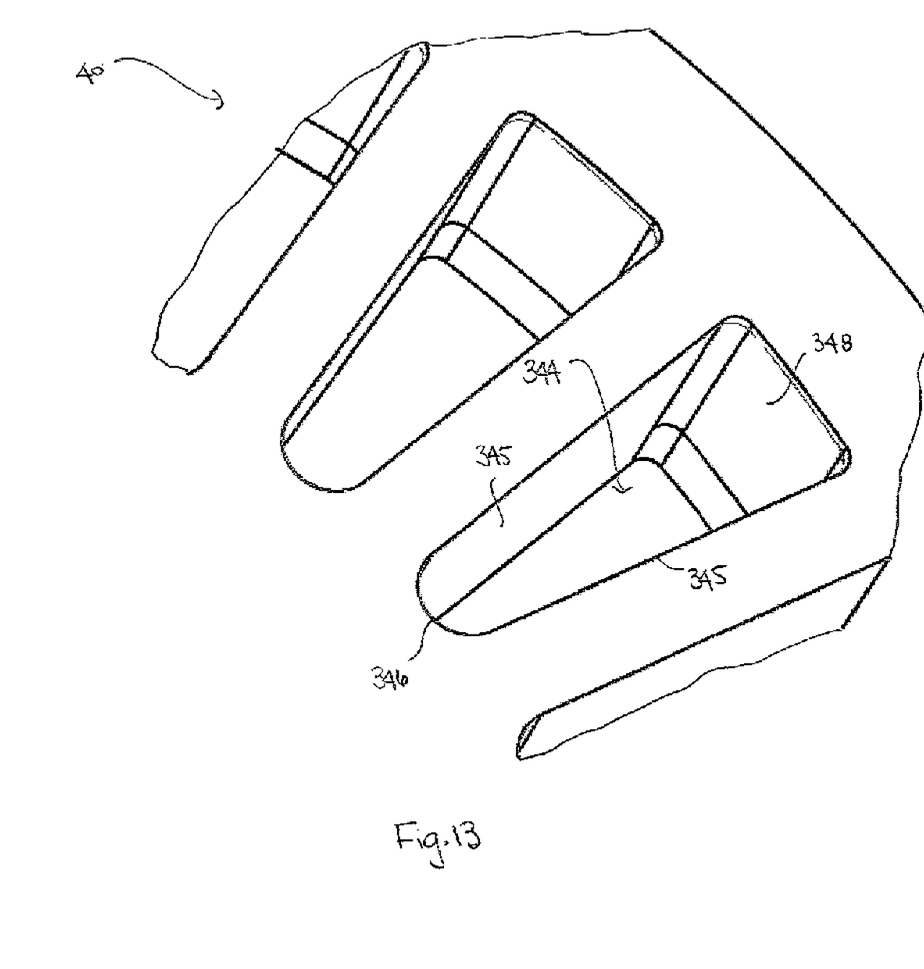
FIG. 13 is a perspective view of an alternative embodiment of a core recess defined through a rotor.
Figure 14:
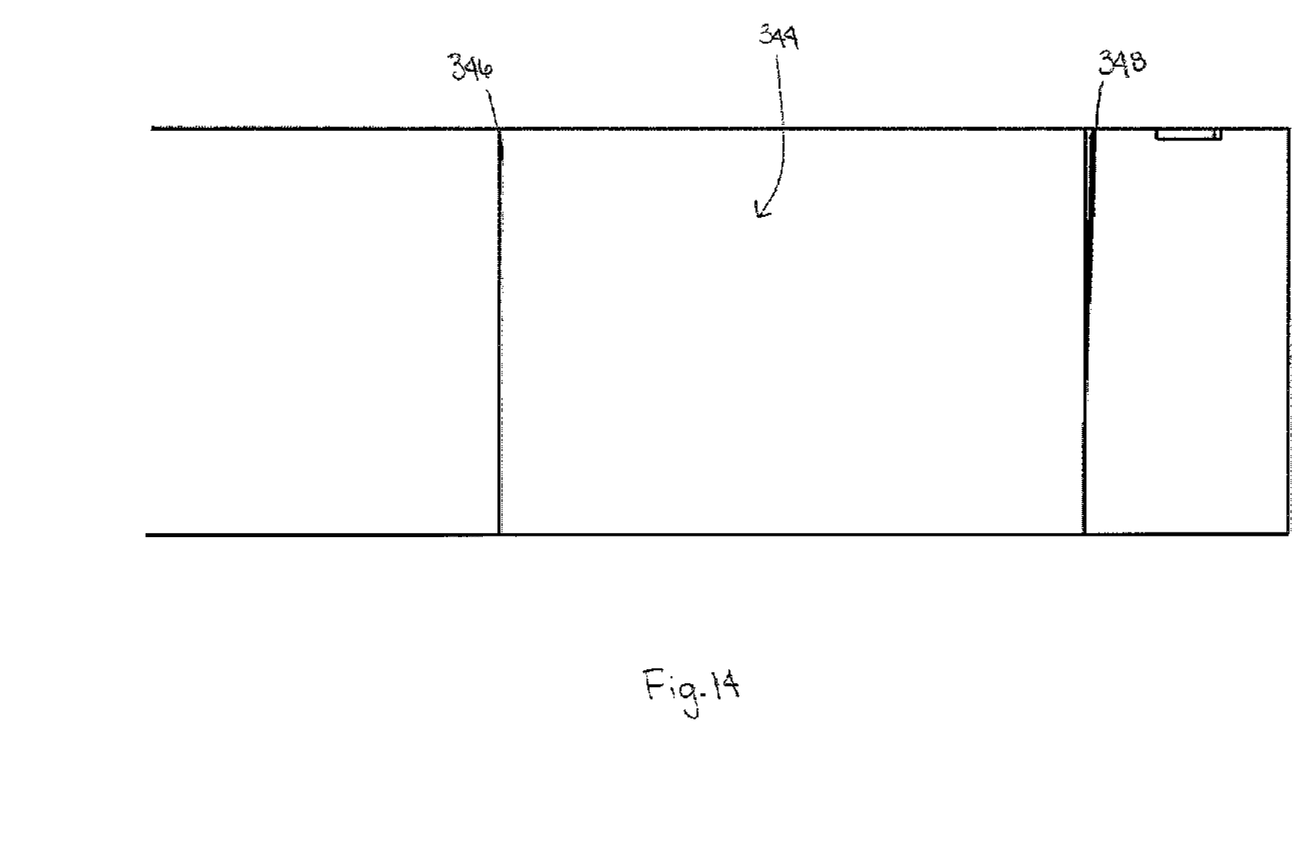
FIG. 14 is a cross-sectional view of the core recess defined through a rotor of FIG. 13.

Another alternative embodiment of a core recess 344 for rotor 40 is shown in FIGS. 13-14. In this embodiment, an outer recess surface 348 of the core recess 344 is tapered along the thickness of the rotor 40 to allow for the core 50 to be press fit into the core recess 344. As shown in FIG. 14, the outer recess surface 348 tapers so that the distance between an inner recess surface 346 and the outer recess surface 348 at the top of the rotor 40 is slightly greater than the distance between the inner recess surface 346 and the outer recess surface 348 at the bottom of the rotor 40. The distance between the inner recess surface 346 and the outer recess surface 348 at the top of the rotor 40 allows the core 50 to be fit within the top portion of the core recess 344, but force is needed to press fit the core 50 so that it fits within the entirety of the core recess 344 as the length of the core recess 344 gradually decreases.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A rotor comprising:
a rotor winding including a top surface, wherein said rotor winding includes a core recess defined through a thickness of the rotor winding;
a core shaped to be inserted into said core recess;
a raised protrusion positioned on and extending from the top surface of said rotor winding adjacent said core recess when said core is partially inserted into said core recess, and said raised protrusion adapted to be pushed into said core recess; and
said raised protrusion configured to deform upon application of force to the top surface of said rotor winding when said core is pushed into said core recess so that material from said raised protrusion flows from said top surface into said core recess to secure said core within said core recess.

2. The rotor of claim 1, wherein said core recess of said rotor winding is further defined as a plurality of core recesses and said core is further defined as a plurality of cores, and wherein one of said cores of said plurality of cores is fit within a respective core recess of said plurality of core recesses.

3. The rotor of claim 2, wherein said raised protrusion is further defined as a plurality of raised protrusions, and at least one raised protrusion is adjacent to each of said core recesses of said plurality of core recesses when a respective core of said plurality of cores is partially inserted into said respective core recess.

4. The rotor of claim 2, wherein said plurality of core recesses are arranged in a circular pattern on said rotor winding.

5. The rotor of claim 1, wherein said core is made from a soft magnetic composite material.

6. The rotor of claim 5, wherein the soft magnetic composite material is formed from pure iron powder particles.

7. The rotor of claim 6, wherein the pure iron powder particles are coated with an electrically insulated layer.

8. The rotor of claim 1, wherein said rotor winding is formed using a powder metallurgy process.

9. The rotor of claim 8, wherein said rotor winding is made from copper.

10. The rotor of claim 1, wherein said core recess includes an inner recess surface that is positioned radially inward of an outer recess surface and opposing side recess surfaces that extend between said inner recess surface and said outer recess surface.

11. The rotor of claim 10, wherein a length of said inner recess surface is less than a length of said outer recess surface.

12. The rotor of claim 10, wherein said raised protrusion is further defined as an inner raised protrusion and an outer raised protrusion with said inner raised protrusion protruding from said top surface of said rotor winding adjacent said inner recess surface of said core recess and said outer raised protrusion protruding from said top surface of said rotor winding adjacent said outer recess surface.

13. A method of forming a rotor comprising:
inserting a core into a core recess defined through a rotor winding, wherein said rotor winding includes a raised protrusion extending from a top surface of said rotor winding, and wherein said raised protrusion is adjacent to said core recess;
applying a force to the top surface of the rotor winding and on a top surface of said core to push the core into the core recess, wherein the force deforms said raised protrusion so that material from said raised protrusion flows into said core recess; and
wherein said material from the raised protrusion that flows into said core recess assists to secure said core within said core recess.

14. The method of claim 13, further comprising:
pressing metal slugs to form said rotor winding through a powder metallurgy process.

15. The method of claim 14, wherein said metal slugs are made from copper.

16. The method of claim 14, further comprising:
machining said rotor winding to form said core recess defined through said rotor winding and to form said raised protrusion extending from said top surface of said rotor winding.

17. The method of claim 13, further comprising:
grinding said top surface of said rotor winding and said top surface of said core after applying said force to smooth said top surface of said rotor winding and of said core.

18. The method of claim 13, wherein there are a plurality of cores and each one of said plurality of cores is inserted into a respective core recess of a plurality of core recesses defined through said rotor winding.

19. The method of claim 18, wherein said rotor winding includes a plurality of raised protrusions extending from said top surface of said rotor winding, and wherein at least one of said raised protrusions is adjacent to each core recess.

20. The method of claim 13, wherein more than one raised protrusion extends from said top surface of said rotor winding, and wherein one of said raised protrusions is positioned adjacent to an inner surface of said core recess and one of said raised protrusions is positioned adjacent to an outer surface of said core recess.

\* \* \* \* \*